Sept. 25, 1934.  H. H. GROVES  1,975,040
JOINT FOR ARTIFICIAL LIMBS
Filed Sept. 7, 1932
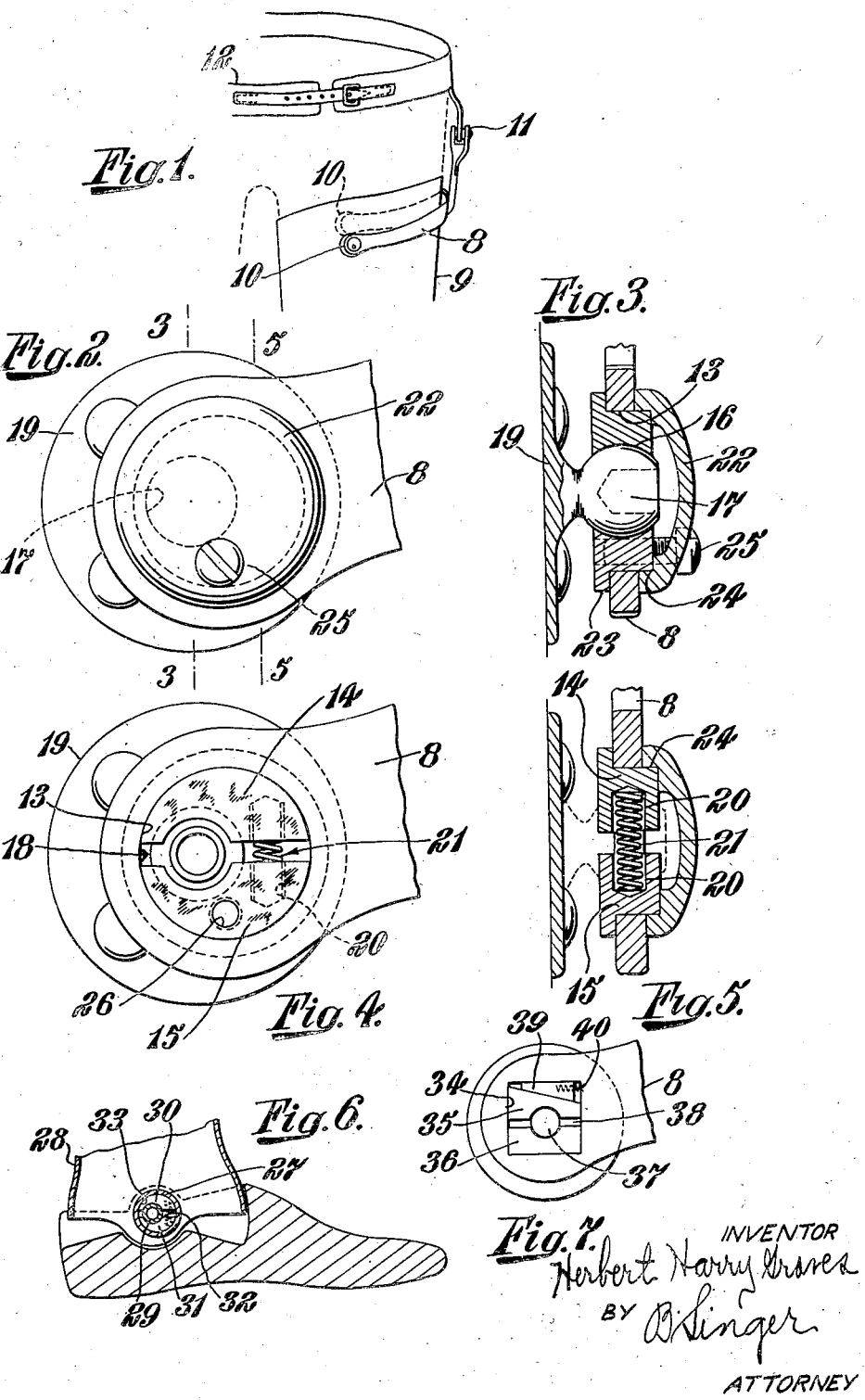

Patented Sept. 25, 1934

1,975,040

UNITED STATES PATENT OFFICE 1,975,040

JOINT FOR ARTIFICIAL LIMBS

Herbert Harry Groves, Kingsbury, England, assignor, by mesne assignments, to Desoutter-Swain Inc., New York, N. Y.

Application September 7, 1932, Serial No. 632,075
In Great Britain March 5, 1932

1 Claim. (Cl. 3—11)

This invention relates to joints for artificial limbs and has for its object to provide these joints of such a character that wear is automatically taken up in the joints.

In general, joints and especially, although not exclusively, pivotal and universal joints for artificial limbs according to the invention comprise a bearing sleeve or collar adapted to receive the pivot, ball or other part of the bearing and to be carried by a suitable housing, such bearing sleeve or collar being made in two or more parts divided at the axis of the joint with a desired gap between the parts where so divided, spring means alone or in association with another member or members, being provided to maintain the parts of such bearing, sleeve or collar in contact with the pivot, ball or the like and with the housing, such spring means thus automatically taking up wear between the pivotal ball or other parts and the bearing sleeve, collar or the like.

The said bearing sleeve, collar or the like may be of any desired size and shape, for example it may be circular with or without a flange or flanges, square or otherwise. Further such bearing sleeve or collar can be formed of any suitable material, for example a synthetic resin, fibre, hardwood, bearing or other metals, for example phosphor bronze or otherwise, and the gaps and spaces in the bearing and housing may if desired be packed with grease or other lubricant.

In most preferred embodiments of the invention the pivot, ball or other part of the bearing is adapted to be accommodated in the bearing sleeve or collar at a position which is eccentric to the centre of said sleeve or collar itself.

The invention may be carried into effect in many constructional ways and in order that the invention may be fully understood three embodiments thereof will now be described with reference to the accompanying drawing wherein:—

Fig. 1 shows the application of joints according to the invention to the so-called stirrup fitting of an artificial limb.

Fig. 2 shows to an enlarged scale an elevational view of a joint according to the invention.

Fig. 3 shows a section on the line 3—3 Fig. 2.

Fig. 4 shows an elevational view of the joint shown in Fig. 2 with the cover cap removed.

Fig. 5 shows a sectional view taken on the line 5—5 Fig. 2.

Fig. 6 shows the application of a joint according to a modified embodiment of the invention to the ankle joint of an artificial limb, and Fig. 7 shows a further modified embodiment of the invention.

Referring to Fig. 1 the stirrup fitting 8 is connected to the upper part of the bucket portion 9 of an artificial limb through the intermediary of the pivoted joints 10, said stirrup fitting being also connected through a joint 11 to a waist belt 12 in the usual manner.

According to one preferred embodiment of the invention the joints 10 are constructed in the manner hereinafter to be described with reference to Figs. 2, 3, 4 and 5. This joint comprises an aperture 13 in the arm of the stirrup member 8, this aperture being adapted to receive a flange collar of synthetic resin, metal or other suitable material made in two parts 14 and 15.

This collar can be regarded as made from one circular flange member or plug adapted to be inserted into the aperture 13 and in an eccentric position is bored and otherwise formed to constitute a socket 16 to receive a ball member 17, a portion being removed from the plug to form a gap 18 thus constituting the two parts 14 and 15.

The two part bearing sleeve thus formed is disposed around the ball member 17 which is integral with and projects from a plate or flange 19 adapted to be attached to the upper part of the bucket 9, for example by riveting, and when the parts are thus assembled it will be obvious that the grip of the spherical socket holds the ball member 17 in position in two bearing parts 14 and 15.

Each of these half bearing members 14 and 15 is provided with a bore 20 extending from the cut inner surface (adjacent the half bearing socket) into the interior of the member with an axis substantially at right-angles to the normal axis of rotation, and these two bores when the parts are in position, come in alignment, and each receives the end of a helical compression spring 21. This compression spring 21 serves to force the two halves of the bearing sleeve into firm contact with the housing, that is the aperture 13, in which they are located and also into firm contact with the ball member 17 so that when wear takes place this spring pressure automatically takes up the wear owing to the eccentricity of the spherical socket 16.

The parts aforesaid are maintained in position by a detachable cover plate or cap 22 coming on the side of the stirrup member 8 remote from the flange 23 of the bearing sleeve members 14 and 15.

On the side carrying this detachable cover plate or cap 22, the bearing members 14 and 15 project to a slight extent and this projection is surrounded by a stepped part 24 of the cover plate or cap 22. On the exterior the said cover plate or cap 22 is preferably formed convex as shown in the drawing but in some cases the exterior may be formed flat or otherwise.

The said cover plate or cap is also provided with an aperture for the passage of a screw 25 screwing into a screw threaded aperture 26 in the bearing member 15.

It will be readily understood that the ball member aforesaid which allows of a pivoting and universal movement, can be replaced by a pivot pin which would allow of only a pivotal movement and not a universal movement. Such an arrangement is shown in Fig. 6 wherein the ankle joint of an artificial limb consists of an outer tubular member 27 secured to the ankle portion 28 of the limb and an inner member 29 constituting a pivot pin which is secured to the foot portion and which is held eccentric with respect to the centre of the tubular member 27 by means of bearing sleeve members 30 and 31 which have a similar action to the members 14 and 15 as hereinbefore described, a spring 32 being provided to automatically take up the wear of the joint. In this case it is preferable to provide a key member 33 to prevent rotation of the sleeve members within the tubular member 27.

Fig. 7 shows another constructional method of carrying the invention into effect and in this case the housing is formed by a square aperture 34 provided in the stirrup member 8 and adapted to accommodate correspondingly shaped bearing members 35 and 36 which are themselves formed with a housing for a pivot pin or ball member 37, whilst leaving a gap 38 between said members. In order to obtain the automatic take-up of wear, the two members 35 and 36 are adapted to be forced to grip the pivot or ball member 37 by the action of a wedge member 39 accommodated between the inner surface of the housing and a bevelled surface of the member 35, the said wedge member 39 being forced by a spring 40 which causes the movement of the wedge and thereby effects the taking-up of the wear of the joint.

It will be obvious that in this latter case a cap or cover plate similar to that hereinbefore described can be otherwise utilized if desired.

It is to be understood that in addition to the foregoing embodiments of the invention many forms of joints and bearings may be constructed according to the invention, comprising in general a suitable housing or the like to receive the parts of the bearing and a suitable pivot, ball or the like to turn in the bearing, the said pivot, ball or the like having if desired means for preventing axial movement such as a spherical formation, a flange or flanges, or being otherwise formed to prevent axial movement or to allow of such axial movement.

Moreover, although preferred forms of bearings in accordance with the invention are made in two bearing parts divided at the axis of rotation by suitable gaps or slots, in some cases more than two parts may be utilized, the spring means in these cases being modified for the purpose.

The invention is not limited to the precise forms or details of construction described as these may be varied to suit the particular joint or joints in an artificial limb it is desired to fit with such bearings.

What I claim and desire to secure by Letters Patent of the United States of America is:—

A pin and socket joint for an artificial limb including a plate member forming one part of the joint having a circular aperture therein, a pair of segmental bearing members within said aperture, said members projecting from both faces of said plate member, flanges on said bearing members seating against one face of said plate member, said bearing members having recesses on their diametrally adjacent faces which together form an eccentrically located socket, a pin engaged in said socket, a detachable cover fitted over the aperture on the other face of said plate member, said cover being recessed interiorly to accommodate the projecting portions of the bearing members, a spring located in housings in the diametrally opposite faces of said bearing members tending to press the socket faces into engagement with the pin and screw means for fastening one of said bearing members rigidly to the detachable cover.

HERBERT HARRY GROVES.